US012386103B2

(12) United States Patent
Liu et al.

(10) Patent No.: US 12,386,103 B2
(45) Date of Patent: Aug. 12, 2025

(54) OPTICAL FILM AND METHOD OF MAKING

(71) Applicant: 3M INNOVATIVE PROPERTIES COMPANY, St. Paul, MN (US)

(72) Inventors: Tao Liu, Woodbury, MN (US); Tri D. Pham, Woodbury, MN (US); Gary T. Boyd, Woodbury (MN); Daniel J. Schmidt, Woodbury, MN (US); Caleb T. Nelson, McKinney, TX (US); Owen M. Anderson, Minneapolis, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 269 days.

(21) Appl. No.: 17/768,399

(22) PCT Filed: Nov. 4, 2020

(86) PCT No.: PCT/IB2020/060374
§ 371 (c)(1),
(2) Date: Apr. 12, 2022

(87) PCT Pub. No.: WO2021/090207
PCT Pub. Date: May 14, 2021

(65) Prior Publication Data
US 2024/0151880 A1 May 9, 2024

Related U.S. Application Data

(60) Provisional application No. 62/932,643, filed on Nov. 8, 2019.

(51) Int. Cl.
*G02B 27/00* (2006.01)
*G02B 1/111* (2015.01)
(Continued)

(52) U.S. Cl.
CPC ............ *G02B 1/118* (2013.01); *G02B 1/111* (2013.01); *G02B 5/003* (2013.01)

(58) Field of Classification Search
CPC ............ G02B 1/00; G02B 1/10; G02B 1/11; G02B 1/111; G02B 1/113; G02B 1/115;
(Continued)

(56) References Cited

U.S. PATENT DOCUMENTS 5,175,030 A 12/1992 Lu et al.
5,183,597 A 2/1993 Lu
(Continued)

FOREIGN PATENT DOCUMENTS

JP 2007183389 A 7/2007
JP 2015075535 A 4/2015
(Continued)

OTHER PUBLICATIONS

International Search report for PCT International Application No. PCT/IB2020/060374 mailed on Jan. 19, 2021, 3 pages.
(Continued)

*Primary Examiner* — Thong Q Nguyen
(74) *Attorney, Agent, or Firm* — Clifton F. Richardson

(57) ABSTRACT

An optical film includes a structured film and a light control film formed on the structured film. The structured film includes a substrate and a plurality of polymeric microstructures formed on a major surface of the substrate. Each microstructure includes an optical facet and a sidewall meeting the optical facet at a ridge of the microstructure. The light control film includes an optically transparent material disposed on and covering the plurality of polymeric microstructures, and a plurality of optically absorptive louvers formed in the optically transparent material opposite the structured film. The louvers extend along a longitudinal direction and are spaced apart along an orthogonal transverse direction. The louvers have an average depth D into the optically transparent material and have an average width W in the transverse direction. D/W can be greater than 2. The optical film is integrally formed.

15 Claims, 11 Drawing Sheets

(51) Int. Cl.
*G02B 1/118* (2015.01)
*G02B 5/00* (2006.01)
*G02B 5/20* (2006.01)

(58) Field of Classification Search
CPC . G02B 1/118; G02B 1/12; G02B 5/00; G02B 5/003; G02B 5/008; G02B 5/02; G02B 5/021; G02B 5/0215; G02B 5/0221; G02B 5/0231; G02B 5/0268; G02B 5/0273; G02B 5/0278; G02B 5/0284; G02B 5/0289; G02B 5/04; G02B 5/045; G02B 5/18; G02B 5/1804; G02B 5/1809; G02B 5/1814; G02B 5/1819; G02B 5/1866; G02B 5/1876; G02B 5/188; G02B 5/1885
USPC .................................. 359/443–461, 599–614
See application file for complete search history.

(56) References Cited

U.S. PATENT DOCUMENTS

| | | | |
|---|---|---|---|
| 6,417,966 B1 | 7/2002 | Moshrefzadeh et al. | |
| 7,253,955 B2* | 8/2007 | Watanabe | G03B 21/62 |
| | | | 359/457 |
| 7,701,648 B2 | 4/2010 | Amano et al. | |
| 8,234,998 B2 | 8/2012 | Krogman et al. | |
| 8,313,798 B2 | 11/2012 | Nogueira et al. | |
| 8,460,568 B2 | 6/2013 | David et al. | |
| 10,365,415 B2 | 7/2019 | Schmidt | |
| 2003/0112515 A1* | 6/2003 | Nakabayashi | G02B 5/1866 |
| | | | 359/566 |
| 2006/0114569 A1 | 6/2006 | Capaldo et al. | |
| 2010/0302654 A1 | 12/2010 | Amano et al. | |
| 2011/0064936 A1 | 3/2011 | Hammond Cunningham et al. | |
| 2011/0304916 A1* | 12/2011 | Ushigome | G02B 27/4272 |
| | | | 359/576 |
| 2012/0204566 A1 | 8/2012 | Hartzell et al. | |
| 2013/0273242 A1 | 10/2013 | Krogman et al. | |
| 2015/0077849 A1* | 3/2015 | Sadahiro | G03B 21/60 |
| | | | 359/455 |

FOREIGN PATENT DOCUMENTS

| | | |
|---|---|---|
| WO | 2018129073 A1 | 7/2018 |
| WO | 2019118685 A1 | 6/2019 |
| WO | 2021090130 A1 | 5/2021 |

OTHER PUBLICATIONS

Mohon et al., Fresnel Lens in an Improved Infinity Image Display System, U.S. Pat. No. H423, Feb. 2, 1988, 5 pages.

\* cited by examiner

OPTICAL FILM AND METHOD OF MAKING

CROSS REFERENCE TO RELATED APPLICATIONS

This application is a national stage filing under 35 U.S.C. 371 of PCT/IB2020/060374, filed Nov. 4, 2020, which claims the benefit of Provisional Application No. 62/932,643, filed Nov. 8, 2019, the disclosures of which are incorporated by reference in their entirety herein.

BACKGROUND

A light control film can include alternating optically transmissive and optically absorptive regions and can be used to regulate the directionally of light transmitted through the film.

Prism films can be used for redirecting light.

SUMMARY

In some aspects, the present disclosure provides an optical film including a structured film and a light control film formed on the structured film. The structured film includes a substrate and a plurality of polymeric microstructures formed on a major surface of the substrate. Each microstructure includes an optical facet and a sidewall meeting the optical facet at a ridge of the microstructure. The light control film includes an optically transparent material disposed on and covering the plurality of polymeric microstructures, and a plurality of optically absorptive louvers formed in the optically transparent material opposite the structured film. The louvers extend along a longitudinal direction and are spaced apart along an orthogonal transverse direction. The louvers have an average depth D into the optically transparent material and have an average width W in the transverse direction. D/W can be greater than 2. The optical film is integrally formed.

In some aspects, the present disclosure provides a method of making an optical film. The method includes providing a structured film including a substrate and a plurality of polymeric microstructures formed on a major surface of the substrate, and forming a light control film on the structured film. Each microstructure includes an optical facet and a sidewall meeting the optical facet at a ridge of the microstructure. The light control film includes an optically transparent material disposed on and covering the plurality of polymeric microstructures, and a plurality of optically absorptive louvers formed in the optically transparent material opposite the structured film. The louvers extend along a longitudinal direction and are spaced apart along an orthogonal transverse direction. The louvers having an average depth D into the optically transparent material and an average width W in the transverse direction. D/W can be greater than 2. Forming the light control film on the structured film includes disposing a resin on the plurality of polymeric microstructures and curing the resin to provide the optically transparent material.

DETAILED DESCRIPTION

Figure 1:
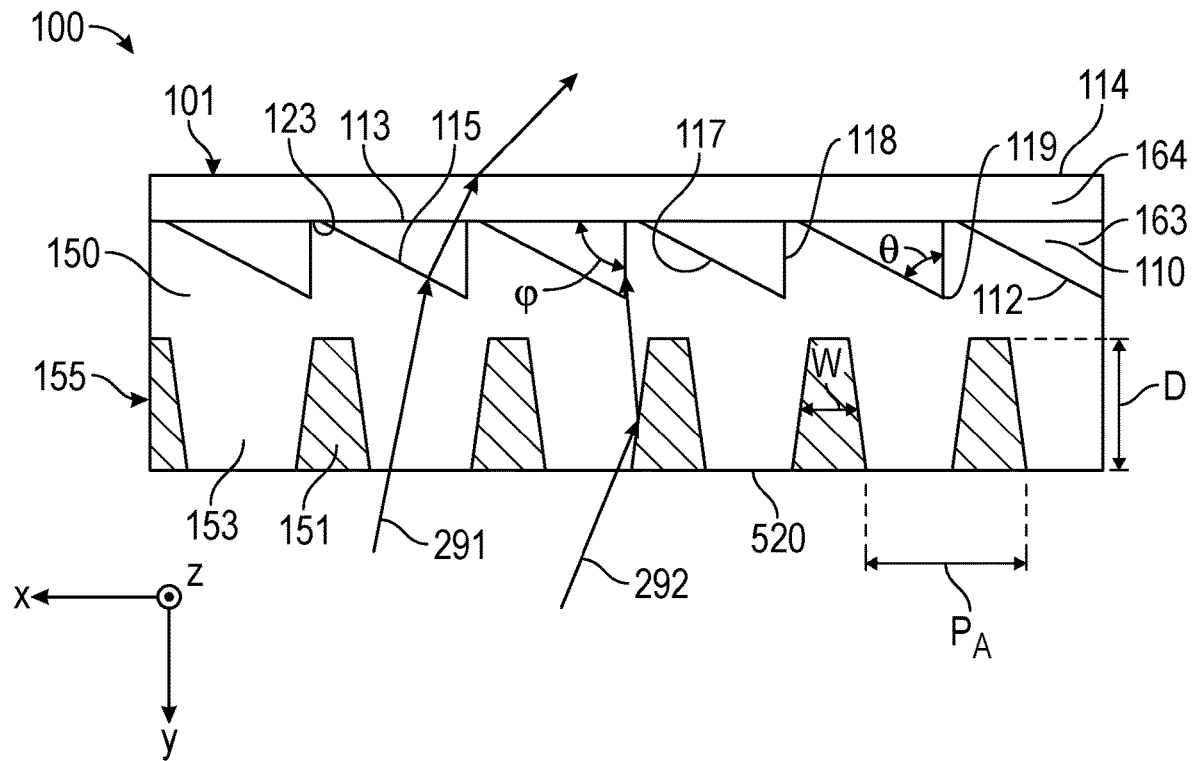
FIG. 1 is a schematic cross sectional view of an optical film.

In the following description, reference is made to the accompanying drawings that form a part hereof and in which various embodiments are shown by way of illustration. The drawings are not necessarily to scale. It is to be understood that other embodiments are contemplated and may be made without departing from the scope or spirit of the present description. The following detailed description, therefore, is not to be taken in a limiting sense.

According to some embodiments, an integrally formed optical film includes a light control film and embedded light deflecting elements (e.g., microstructures of a structured film) facing the light control film. The light control film can include optically absorptive louvers disposed such that light incident on the light control film side of the optical film is partially collimated by the louvers before the light is incident on the light deflecting elements. The light deflecting elements can then alter the direction of the partially collimated light.

In some embodiments, the light control film utilizes high aspect ratio louvers as generally described in International Appl. Pub. No. WO 2019/118685 (Schmidt et al.). In some embodiments, the louver includes an optically absorbing core layer and cladding layer(s) disposed on one or both sides of the core layer. High aspect ratio louvers preferably have a relatively high extinction coefficient in order to efficiently absorb light in a thin layer. The high extinction coefficient can produce a reflective, metal-like interface with the transmissive regions of the light control film. It has been found that adding cladding layers on each side of a high extinction coefficient core, for example, reduces louver reflectivity and thereby reduces high angle light leakage through the light control film.

In some embodiments, the optical film includes a structured film that includes the light deflecting elements which can be a plurality of microstructures (i.e., structures having at least two orthogonal dimensions, such as a width and a height, less than 1 mm and greater than 100 nm) having optical facets and sidewalls. In some cases, it is desired to include optically absorptive material on the sidewalls as this has been found to reduce undesired redirection of light caused by the sidewalls that would otherwise occur in some applications. Utilizing thin optically absorptive layers has been found to reduce undesired effects (e.g., blocking light incident on an edge of the layer that would be desired to be transmitted) of the optically absorptive layers. When the optically absorptive layer is thin, it preferably has a relatively high extinction coefficient in order to efficiently absorb light. The high extinction coefficient can produce a reflective interface with the sidewall (e.g., similar to a reflective interface between the optically absorptive louvers and the optically transparent material). It has been found that adding a cladding layer between a high extinction coefficient absorbing layer and the sidewall can reduce reflectivity and thereby reduce undesired light redirection by the sidewalls. A cladding layer can alternatively or additionally be disposed on the optically absorptive layer opposite the sidewall.

Figure 2:
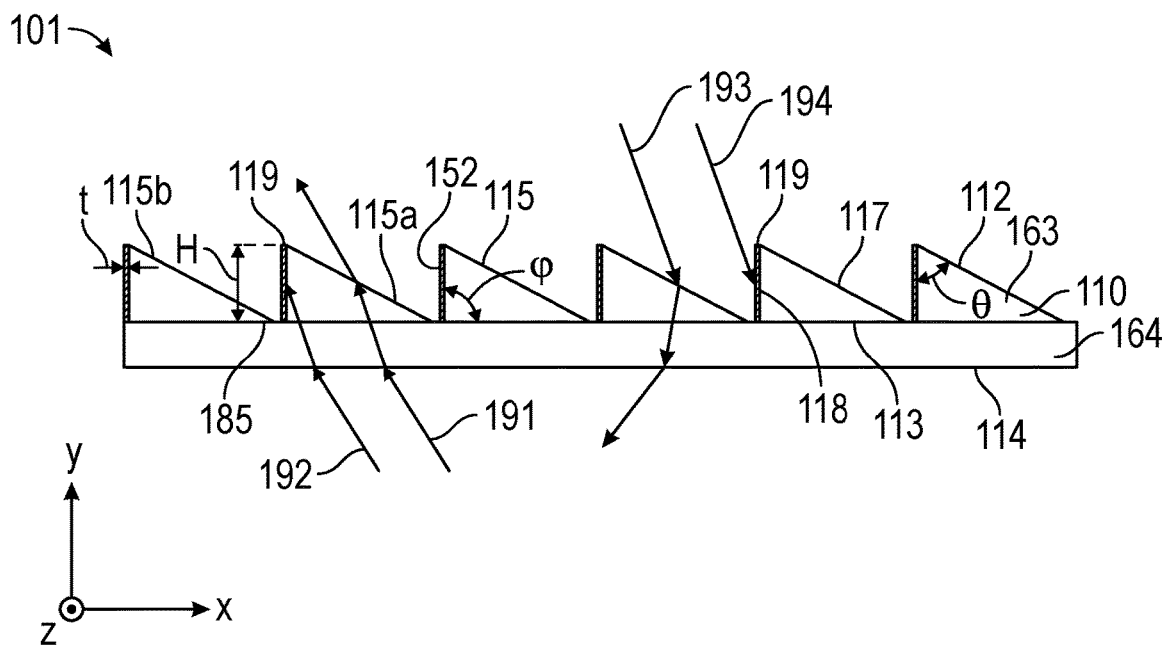
FIG. 2 is a schematic cross-sectional view of a structured film.
Figure 3:
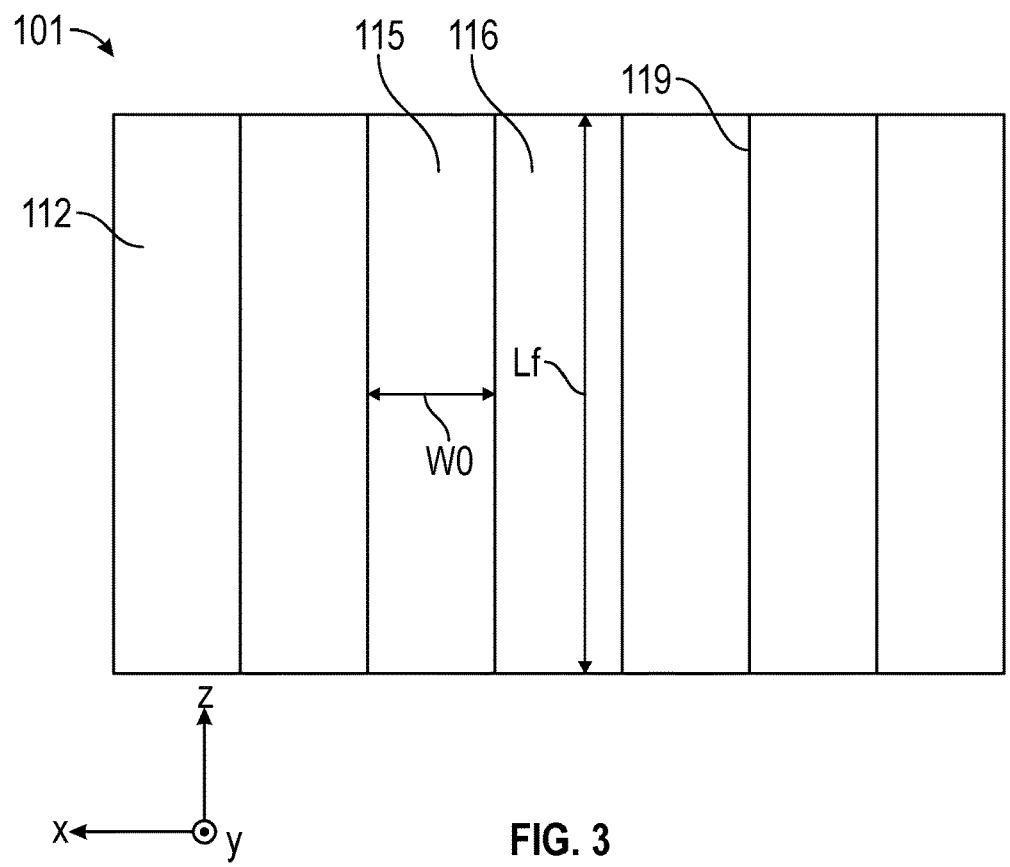
FIG. 3 is a schematic plan view of a structured surface of a structured film.
Figure 4:
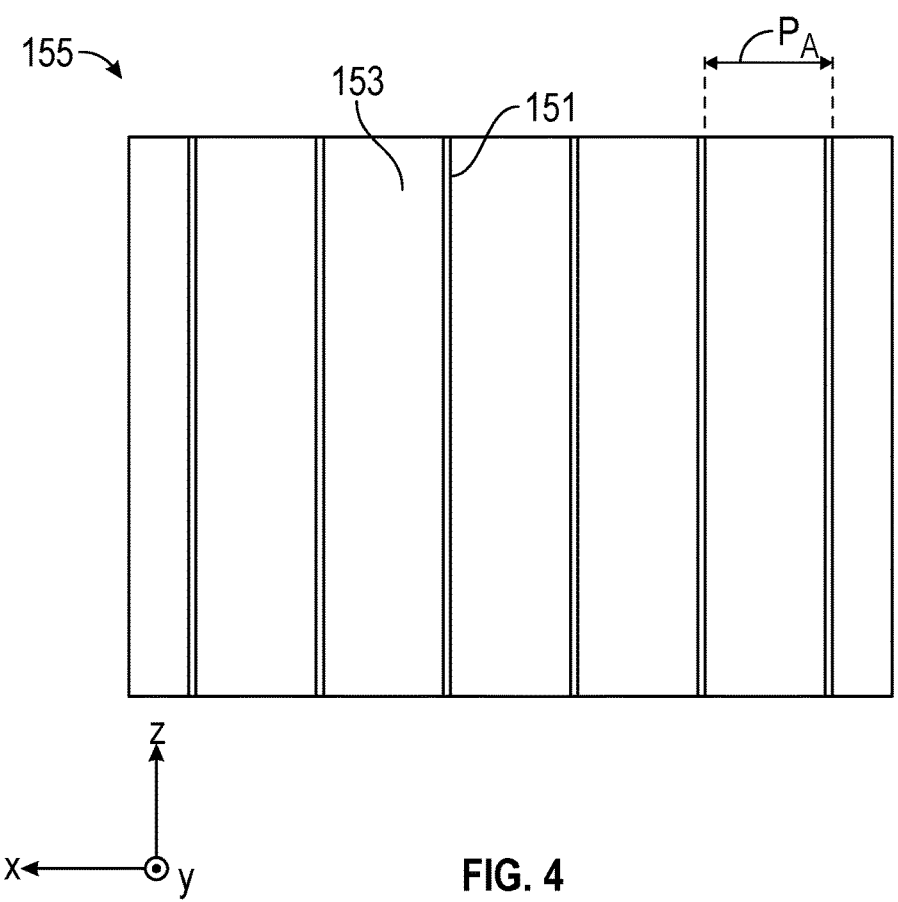
FIG. 4 is a schematic plan view of a light control film.

FIG. 1 is a schematic cross sectional view of an optical film 100 including a structured film 101 and a light control film 155 formed on the structured film 101. FIG. 2 is a schematic cross-sectional view of some embodiments of the structured film 101. FIG. 3 is a schematic plan view of a structured surface 112 of the structured film 101. FIG. 4 is a schematic plan view of the light control film 155.

The structured film 101 can include a substrate 164 and a plurality of polymeric microstructures 115 formed on a major surface 123 of the substrate 164. Each microstructure 115 includes an optical facet 117 and a sidewall 118 meeting the optical facet 117 at a ridge 119 of the microstructure 115. Microstructures are structures having at least two orthogonal dimensions, such as a width and a height, less than 1 mm and greater than 100 nm. The structured film 101 can include a polymeric layer 110 that includes the microstructures 115.

The light control film 155 includes an optically transparent material 150 disposed on and covering the plurality of polymeric microstructures 115, and a plurality of optically absorptive louvers 151 formed in the optically transparent material 150 opposite the structured film 101. The louvers 151 extend along a longitudinal direction (z-direction) and are spaced apart along an orthogonal transverse direction (x-direction). The louvers 151 have an average depth D into the optically transparent material (along the y-direction) and an average width W in the transverse direction. The louvers 151 can extend into the optically transparent material 150 in a direction (y-direction) substantially orthogonal (e.g., within 30 degrees, or 20 degrees, or 10 degrees, or 5 degrees of orthogonal) to a major surface (e.g., one or both of the opposing major surfaces 113 or 520). In some embodiments, D/W>1.5, or D/W>2, or D/W>2.5, or D/W>3. In some embodiments, high aspect ratio louvers are utilized as described further elsewhere herein. In some embodiments, D/W>10, or D/W>15, or D/W>20, or in any of the ranges described elsewhere herein. The louvers 151 are arranged at a pitch $P_A$ and alternate with optically transmissive regions 153. The microstructures have a width W0 (see, e.g., FIG. 3). $P_A$ and W0 can be about the same or different. $P_A$ and W0 can each be in a range of 1 micrometer to 200 micrometers, for example.

In some embodiments, the optical film 100 is integrally formed. As used herein, a first element "integrally formed" with a second element means that the first and second elements are manufactured together rather than manufactured separately and then subsequently joined. Integrally formed includes manufacturing a first element followed by manufacturing the second element on the first element.

The structured film 101 can have a structured first major surface 112 at an interface with the optically transparent material 150 and can have an opposite second major surface 114. Each microstructure 115 includes an optical facet 117 and a sidewall 118 meeting the optical facet 117 at a ridge 119 of the microstructure. The optical facet 117 and the sidewall 118 define an oblique angle θ therebetween. In some embodiments, the oblique angle θ is at least 20 degrees or at least 30 degrees. In some embodiments, the oblique angle θ is no more than 80 degrees or no more than 70 degrees. In some embodiments, each microstructure in the plurality of polymeric microstructures 115 is a linear prism having a substantially same angle θ between the optical facet 117 and the sidewall 118. For example, optical element 116 (see, e.g., FIG. 3) can be a linear prism. In some embodiments, the plurality of polymeric microstructures 115 can define a Fresnel lens. Fresnel lenses are known in the art and are described in U.S. Pat. No. 7,701,648 (Amano et al.), for example, and in U.S. Pat. Appl. Pub. Nos. 2010/0302654 (Amano et al.) and 2012/0204566 (Hartzell et al.), for example. In some embodiments, each microstructure in the plurality of polymeric microstructures 115 is a linear Fresnel element. For example, optical element 116 can be a linear Fresnel element. In some embodiments, for each microstructure 115, the ridge 119 of the microstructure extends along the longitudinal direction across at least a majority of the length Lf of the optical film (see, e.g., FIG. 3). In some embodiments, Lf/W0>10 or Lf/W0>100. In some embodiments, for each microstructure 115 in at least a majority of the microstructures (e.g., all of the microstructures, or all of the microstructures except those along one or more edges, or at least 80% of the microstructures), an optically absorptive layer 152 (see, e.g., FIG. 2) is disposed on and substantially covers the sidewall 118 (e.g., covers at least 70%, or at least 80%, or at least 90% of a total area of the sidewall 118). The optically absorptive layer 152 can have an average thickness t, where 100 nm<t<2 micrometers, or 100 nm<t<1 micrometer. In some embodiments, the average thickness t is less than 500 nm. The optically absorptive layer 152 can be included to block light incident on the sidewall 118 that would otherwise be redirected into an undesired direction. For example, light rays 191 and 192 are incident on the second major surface 114 of the structured film 101 along a substantially same direction, and light ray 191 is refracted by an optical facet into a desired direction while light ray 192 is blocked from being redirected by a sidewall into an undesired direction. Similarly, light rays 193 and 194 are incident on the first major surface 112 along a substantially same direction, and light ray 193 is refracted by an optical facet into a desired direction while light ray 194 is blocked from being redirected by a sidewall into an undesired direction. As another example, light ray 291 is incident on the major surface 520 of the optical film 100 (see, e.g., FIG. 1), and is then transmitted through the light control film 155 and is then redirected by a microstructure 115 into a desired direction, while light ray 292 is reflected from a louver and is incident on a sidewall 118 such that it could be redirected into an undesired direction.

Utilizing thin (e.g., less than 1 micrometer thick) optically absorptive layers has been found to reduce undesired effects (e.g., blocking light incident on an edge of the layer that would be desired to be transmitted) of the optically absorptive layers. When the optically absorptive layer is thin, it preferably has a relatively high extinction coefficient in order to efficiently absorb light. The high extinction coefficient can produce a reflective, metal-like interface with the sidewall. It has been found that adding a cladding layer (e.g., a layer having an extinction coefficient less than that of the optically absorptive layer and greater than that of the sidewall material) between a high extinction coefficient absorbing layer and the sidewall, and/or between the absorbing layer and the optically transparent material 150, can reduce reflectivity and thereby reduce undesired light redirection by the sidewalls. A thin optically absorptive layer, and optionally a cladding layer, can be formed on the sidewalls by depositing the layer(s) over the (e.g., entire) structured surface and then removing the layer(s) from the optical facets by selectively (e.g., anisotropically) etching the layer from the optical facets, for example.

Using thin optically absorptive layers can result in a high aspect ratio. In some embodiments, for each microstructure in at least a majority of the microstructures 115, the sidewall 118 of the microstructure 115a has a height H from a base 185 of an adjacent microstructure 115b to the ridge 119 of the microstructure. In some embodiments, H/t>10, or H/t>12, or H/t>15, or H/t>18, or H/t>20. For example, in some embodiments, 100>H/t>15. In some embodiments, H is less than 1 mm. In some embodiments, H is greater than 100 nm.

In some embodiments, the optically absorptive layer 152 is omitted. In some embodiments, a diffusive layer or a roughened sidewall surface (e.g., provided by a tool used to make the microstructures 115) can be used to provide diffusion to reduce any undesired effects of light incident on the sidewalls. Diffusion can alternatively be provided in other layers of the optical film 100 (e.g., the substrate 164 can be a (e.g., weak) diffuser). In some embodiments, the effects of light incident on the sidewalls is reduced by increasing a refractive index difference between the polymeric microstructures 115 and the optically transparent material 150 which allows the height H of the microstructures 115 to be reduced to achieve a desired optical effect.

In some embodiments, the plurality of polymeric microstructures 115 has a refractive index n1, the optically transparent material 150 has a refractive index n2, and n1-n2>0.05, or n1-n2>0.1, or n1-n2>0.15.

In some embodiments, the light control film (LCF) utilizes high aspect ratio louvers (absorptive regions) as described in International Appl. Pub. No. WO 2019/118685 (Schmidt et al.). In brief summary, such louvers can be made by forming a structured surface defining channels and planar top and bottom surfaces (see, e.g., top and bottom surfaces 273 and 274 depicted in FIG. 20) between the channels (e.g., by casting and curing against structured film 101 and against a structured tool surface opposite the structured film), conformally coating the structured surface with at least one optically absorptive layer (e.g., an optically absorptive core layer and optionally cladding layer(s) on one of both sides of the optically absorptive core layer), removing (e.g., via reactive ion etching or laser ablation) the optically absorptive layer from the planar top and bottom surfaces while leaving the optically absorptive layer on the sidewalls of the channels, and filling in the channels between the optically absorptive layer on the sidewalls with an optically transparent material. High aspect ratio louvers preferably have a relatively high extinction coefficient in order to efficiently absorb light in a thin layer. The high extinction coefficient can produce a reflective interface with the transmissive regions of the light control film. It has been found that adding cladding layers on one or both sides of a high extinction coefficient core reduces louver reflectivity and thereby reduces high angle light leakage and ghosting.

Figure 5A:
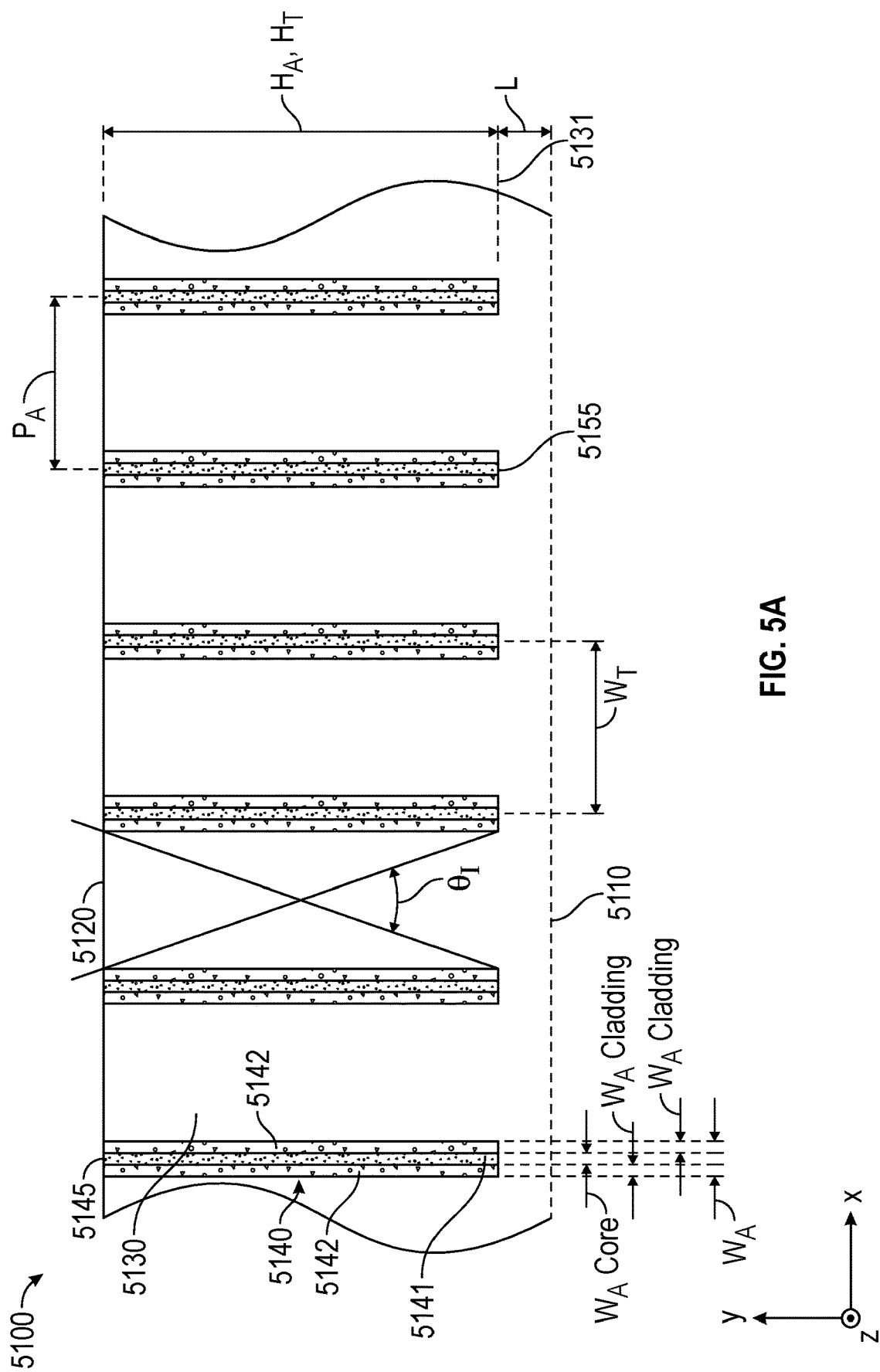
FIGS. 5A-5B are schematic cross-sectional views of light control films.
Figure 5B:
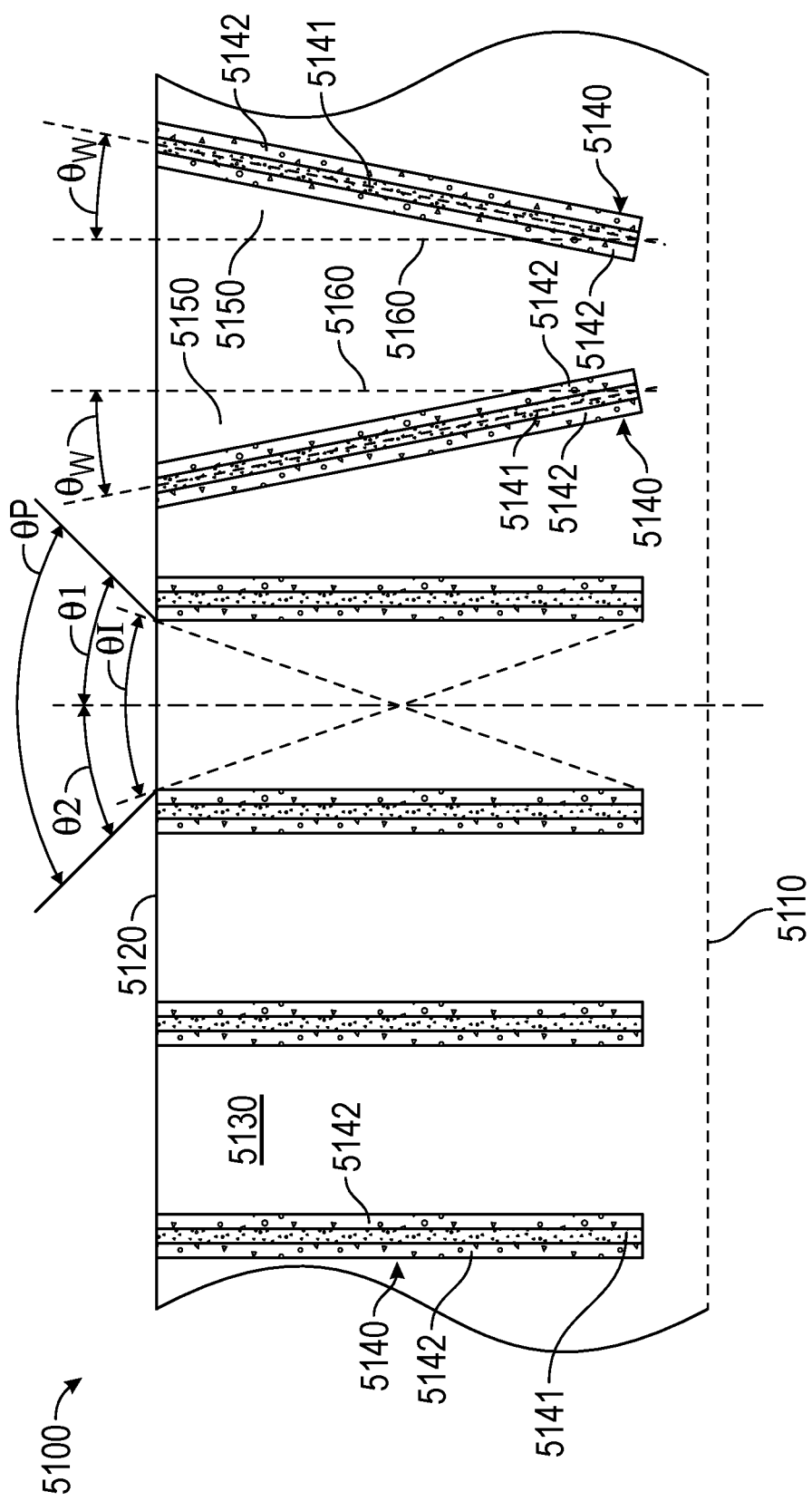

FIGS. 5A-5B are schematic cross-sectional views of some embodiments of an LCF 5100 which may correspond to light control film 155. The LCF 5100 has a major surface 5120 opposite the structured film (not shown in FIGS. 5A-5B). The dotted line 5110 can schematically represent the level of the ridges 119 of the structured film. LCF 5100 includes alternating transmissive regions 5130 and absorptive regions 5140 disposed between the major surface 5120 and the structured film (e.g., structured film 101). Absorptive regions 5140 include core 5141 and cladding layers 5142.

In some embodiment, as depicted in FIG. 5A, the transmissive regions 5130 are typically integral with a land region L, meaning that there is no interface between the land region and the base portion 5131 of the transmissive regions 5130. Alternatively, the LCF may lack such land region L.

The transmissive regions 5130 can be defined by a width $W_T$. Excluding the land region L, the transmissive regions 5130 typically have nominally the same height as the absorptive regions 5140. In typical embodiments, the height of the absorptive regions, $H_A$, is at least 30, 40, 50, 60, 70, 80, 90 or 100 micrometers. In some embodiments, the height is no greater than 200, 190, 180, 170, 160, or 150 micrometers. In some embodiments, the height is no greater than 140, 130, 120, 110, or 100 micrometers. The LCF typically includes a plurality of transmissive regions having nominally the same height and width. In some embodiments, the transmissive regions have a height, $H_T$, a maximum width at its widest portion, $W_T$, and an aspect ratio, $H_T/W_T$, of at least 1.75. In some embodiments, $H_T/W_T$ is at least 2.0, 2.5, 3.0, 3.5, 4.0, 4.5 or 5.0. In other embodiments, the aspect ratio of the transmissive regions is at least 2, 3, 4, 5, 6, 7, 8, 9 or 10. In other embodiments, the aspect ratio of the transmissive regions is at least 15, 20, 25, 30, 35, 40, 45, or 50.

Absorptive regions 5140 have a height $H_A$ defined by the distance between the bottom surface 5155 and top surface 5145, such top and bottom surfaces typically being parallel to the surface 5120. The height $H_A$ may also be referred to as the depth D of the absorptive regions into the light control film. The absorptive regions 5140 have a maximum width $W_A$ and are spaced apart along the surface 5120 by a pitch $P_A$.

The width of the absorptive regions, $W_A$, at the base (i.e., adjacent to bottom surface 5155) is typically nominally the same as the width of the absorptive regions adjacent the top surface 5145. However, when the width of the absorptive regions at the base differs from the width adjacent the top surface, the width is defined by the maximum width. The maximum width of a plurality of absorptive regions can be averaged for an area of interest, such as an area in which the transmission (e.g., brightness) is measured. The LCF typically includes a plurality of absorptive regions having nominally the same height and width. In typical embodiments, the absorptive regions generally have a width no greater than 10, 9, 8, 7, 6, 5, 4, 3, 2, or 1 micrometers. In some embodiments, the absorptive regions generally have a width no greater than 5, 4, 3, 2, or 1 micrometers. In some embodiments, the absorptive regions have a width of at least 150, 160, 170, 180, 190, or 200 nanometers.

The absorptive regions include a core sandwiched between one or more cladding layers. The cores have a width, $W_{Acore}$, and the cladding layers have a width, $W_{Acladding}$. In typical embodiments, the cores generally have a width no greater than 5, 4, 3, 2, or 1 micrometers. In some embodiments, the cores generally have a width no greater than 900, 800, 700, 600, 500, 400, 300, or 200 nanometers. In some embodiments, the cores have a width of at least 50, 60, 70, 80, 90, or 100 nanometers. In typical embodiments, each cladding layer generally has a width no greater than 5, 4, 3, 2, or 1 micrometer. In some embodiments, each cladding layer generally has a width no greater than 900, 800, 700, 600, 500, 400, 300, or 200 nanometers. In some embodiments, each cladding layer has a width of at least 50, 60, 70, 80, 90, or 100 nanometers.

An absorptive region can be defined by an aspect ratio, the height of the absorptive region divided by the maximum width of the absorptive region ($H_A/W_A$). In some embodiments, the aspect ratio of the absorptive regions is at least 1, 2, 3, 4, 5, 6, 7, 8, 9, or 10. In favored embodiments, the height and width of the absorptive region(s) are selected such that the absorptive region(s) have an even higher aspect ratio. In some embodiments, the aspect ratio of the absorptive regions is at least 15, 20, 25, 30, 35, 40, 45, 50, 55, 60, 65, 70, 75, 80, 85, 90, 95 or 100. In other embodiments, the aspect ratio of the absorptive regions is at least 200, 300, 400, or 500. The aspect ratio can range up to 10,000 or greater. In some embodiments, the aspect ratio is no greater than 9,000; 8,000; 7,000; 6,000, 5,000; 4,000, 3000; 2,000, or 1,000.

As shown in FIG. 5B, LCF 5100 includes alternating transmissive regions 5130 and absorptive regions 5140 including core 5141 and cladding layers 5142, and an interface 5150 between transmissive regions 5130 and absorptive regions 5140. Interface 5150 forms a wall angle θw with line 5160 that is perpendicular to the surface 5120.

Larger wall angles θw decrease transmission at normal incidence or in other words a viewing angle of 0 degrees. Smaller wall angles are preferred such that the transmission of light at normal incidence can be made as large as possible. In some embodiments, the wall angle θw is less than 10, 9, 8, 7, 6, or 5 degrees. In some embodiments, the wall angle is no greater than 2.5, 2.0. 1.5, 1.0, 0.5, or 0.1 degrees. In some embodiments, the wall angle is zero or approaching zero. When the wall angle is zero, the angle between the absorptive regions and surface 5120 is 90 degrees. Depending on the wall angle, the transmissive regions can have a rectangular or trapezoidal cross-section. The transmission (e.g. brightness of visible light) can be increased when incident light undergoes total internal reflection (TIR) from the interface between the absorptive and transmissive regions. Whether a light ray will undergo TIR or not, can be determined from the incidence angle with the interface, and the difference in refractive index of the materials of the transmissive and absorptive regions.

As shown in FIG. 5B, transmissive regions 5130 between absorptive regions 5140 have an interface angle $θ_I$ defined by the geometry of alternating transmissive regions 5130 and absorptive regions. As depicted in FIGS. 5A and 5B, the interface angle $θ_I$ can be defined by the intersection of two lines. The first line extends from a first point, defined by the bottom surface and the side wall surface of a first absorptive region, and a second point defined by the top surface and side wall surface of the nearest second absorptive region. The second line extends from a first point defined, by the top surface and the side wall surface of the first absorptive region, and a second point, defined by the bottom surface and side wall surface of the second absorptive region.

The polar cut-off viewing angle θP is equal to the sum of a polar cut-off viewing half angle θ1 and a polar cut-off viewing half angle θ2 each of which are measured from the normal to surface 5120. In typical embodiments, the polar cut-off viewing angle θP is symmetric, and polar cut-off viewing half angle θ1 is equal to polar viewing half angle θ2. Alternatively, the polar cut-off viewing angle θP can be asymmetric, and polar cut-off viewing half angle θ1 is not equal to polar cut-off viewing half angle θ2.

Returning to FIG. 1, the optical film 100 can include the light control film 5100 in place of the light control film 155.

Figure 6:
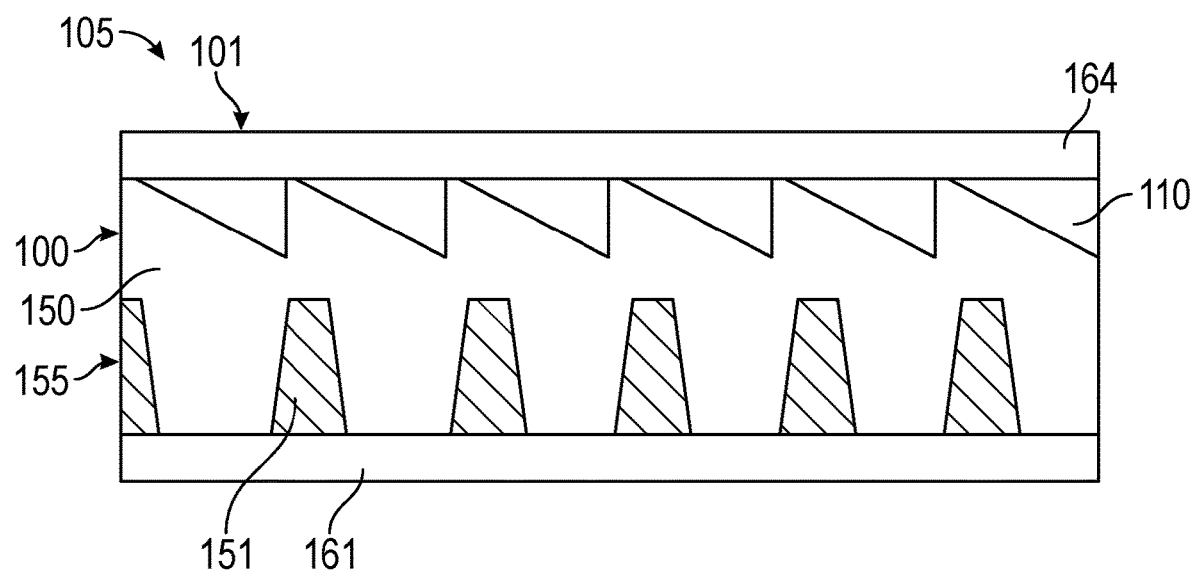
FIG. 6 is a schematic cross-sectional view of an optical stack.

The optical film 100, which can be integrally formed, can be included in an optical stack, which may be formed from one or more components that are separately formed and subsequently joined. For example, an optical stack can include the optical film 100 bonded to one or more additional layers. FIG. 6 is a schematic cross-sectional view of an optical stack 105 including the optical film 100 laminated to a second substrate 161 with the light control film 155 facing the second substrate 161.

Figure 8:
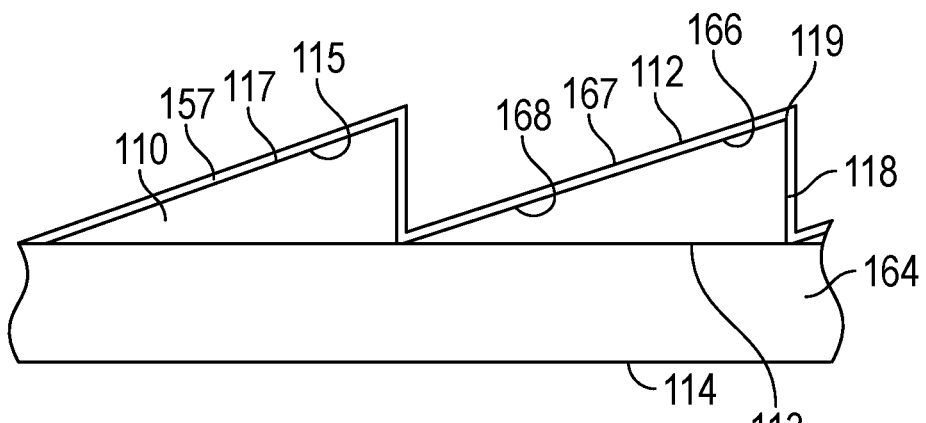

In some embodiments, the structured film 101 includes a polymeric layer 110 including a microstructured surface 168 at least partially coated (e.g., conformally coated) with an inorganic optically transparent layer 157 (see, e.g., FIG. 8). A polymeric layer is a layer including a continuous phase of organic polymer. A polymeric layer can also include inorganic nanoparticles dispersed in the continuous phase of organic polymer, for example. Nanoparticles can be included to increase the refractive index of the layer, for example. The inorganic optically transparent layer 157 can include opposing first 167 and second 166 major surfaces where the second major surface 166 faces the polymeric layer 110. The first major surface 167 of the inorganic optically transparent layer 157 may include at least a majority of the first major surface 112 of the structured film 101. For example, the surface 168 of the polymeric layer 110 may be a major surface which is substantially entirely (e.g., all except possibly edge regions) conformally coated with the inorganic optically transparent layer 157 so that the first major surface 167 includes substantially all of the first major surface 112 (e.g., the first major surface 112 of the structured film 101 can be the first major surface 167 of the inorganic optically transparent layer 157). In some embodiments, the first major surface 167 of the inorganic optically transparent layer 157 includes the sidewall portions of the first major surface 112 of the structured film 101.

As described further elsewhere herein, the inorganic optically transparent layer can be used as an etch stop in processes for removing the optically absorptive layer and/or other layers from the optical facets. Suitable materials for the inorganic optically transparent layer include α-Si, SiOx, SiAlOx, SiCyOx, $TiO_2$, and AlOx, for example. The layer can be sufficiently thin that greater than 60%, for example, of normally incident visible light is transmitted through the layer. A layer can be considered optically transparent if the layer has an average optical transmittance (unweighted mean over wavelength for unpolarized light) of visible light (wavelengths in a range of 400 nm to 700 nm) normally incident on the layer in air that is at least 60%. In some embodiments, the average optical transmittance of an inorganic optically transparent layer is greater than 60%, or greater than 70%, or greater than 80%, or greater than 85%, or greater than 90%.

The polymeric layer 110 can include a polymeric structured layer 163 formed on a substrate 164 which can be a polymeric substrate. Alternatively, the polymeric layer can refer to the polymeric structured layer 163 which may be formed on a polymeric substrate or on a non-polymeric substrate (e.g., a glass substrate). The polymeric structured layer 163 can be formed on a substrate 164 using a cast and cure process, as is known in the art (see, e.g., U.S. Pat. Appl. Pub. No. 2006/0114569 (Capaldo et al.) and U.S. Pat. No. 5,175,030 (Lu et al.) and U.S. Pat. No. 5,183,597 (Lu)). Other methods for making the polymeric structured layer 163 include extrusion, machining, and embossing. Any suitable materials can be used. For example, an acrylate (e.g., polymethylmethacrylate) can be cast and cured onto a polyester (e.g., polyethylene terephthalate) substrate.

In the embodiments illustrated in FIGS. 1 and 8, for example, the polymeric layer 110 has a major surface 113 facing the substrate 164. In some embodiments, for each microstructure in at least the majority of the microstructures 115, the sidewall 118 of the microstructure is substantially normal (e.g., within 30 degrees, or 20 degrees, or 10 degrees, or 5 degrees of normal) to a major surface 114 or 113 of the polymeric layer 110 opposite the microstructured surface 168. In some embodiments, for each microstructure in at least the majority of the microstructures 115, the sidewall 118 of the microstructure makes an angle φ with a base 185 of the microstructure (see, e.g., FIGS. 2 and 13-15), where φ is in a range of 80 degrees to 90 degrees or 85 degrees to 90 degrees, for example. In some embodiments, φ is less than 90 degrees (e.g., 85 to 89.5 degrees) due to manufacturing constraints, for example.

Figure 7:
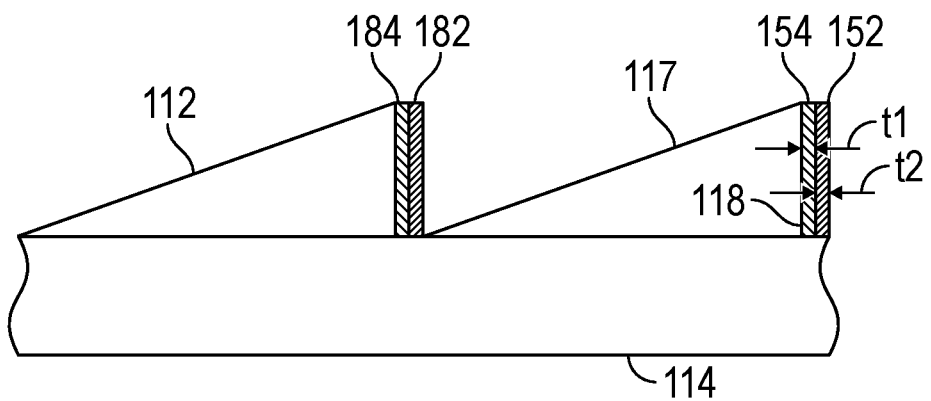
FIGS. 7-12 are schematic cross-sectional views of portions of structured films.

FIG. 7 is a schematic cross-sectional view of a portion of a structured film (e.g., corresponding to structured film 101). In some embodiments, for each microstructure in at least the majority of the microstructures, a first layer 154 is disposed between the sidewall 118 and the optically absorptive layer 152. The first layer 154, which may be referred to as a cladding layer, can be included to reduce reflection of light at an interface between the sidewall and the optically absorptive layer 152. In some embodiments, the first layer 154 has an extinction coefficient k1 and the optically absorptive layer 152 has an extinction coefficient k2. In some embodiments, k2>k1. In some embodiments, the plurality of polymeric microstructures has an extinction coefficient k0<0.05. In some embodiments, k2>k1>k0. In some embodiments, k2-k1 is greater than 0.05, 0.1, 0.15, or 0.2. In some embodiments, k2-k1 is less than 1, or less than 0.8, or less than 0.5 In some embodiments, k1-k0 is greater than 0.001, 0.005, or 0.01. In some embodiments, k1-k0 is less than 0.15, or less than 0.1, or less than 0.05. In some embodiments, k0 is less than 0.01, or less than 0.005, or less than 0.002. In some embodiments, k1 is in a range of 0.005 to 0.15, or 0.01 to 0.1. In some embodiments, k2 is in a range of 0.1 to 0.5, or 0.2 to 0.4. In some embodiments, k1<0.5 k2. In some embodiments, 0.005<k1<0.5 k2. In other embodiments, the first layer 154 is disposed on the optically absorptive layer 152 opposite the sidewall 118.

Similarly, in some embodiments, the cladding layer(s) 5142 have an extinction coefficient k1' and the optically absorptive core layer 5141 has an extinction coefficient k2', where k1' and k2' can be in any of the ranges described above for k1 and k2, respectively.

Instead of, or in addition to, describing the first layer 154 and the optically absorptive layer 152, or the cladding layer(s) 5141 and the core layer 5141, in terms of extinction coefficient, the layers can be described in terms of concentration of optically absorptive material as described further elsewhere herein.

In some embodiments, the optically absorptive layer 152 has a refractive index n1' and the first layer 154 has a refractive index n2', where |n1'-n2'| is less than 0.5, or less than 0.3, or less than 0.2, or less than 0.1. Similarly, the absolute value of the difference in refractive indices of the core layer 5141 and the cladding layer(s) 5141 can be in any of these ranges.

The extinction coefficient can be expressed as the imaginary part of a complex index of refraction and the refractive index can be expressed as the real part of the complex index of refraction. The extinction coefficient and refractive index can be understood to be evaluated at a wavelength of 550 nm, except where indicated otherwise.

The extinction coefficient, k, of a thin film coating, for example, can be determined via either ellipsometry or spectroscopy, for example. k can be expressed as $\alpha\lambda/(4\pi)$ where a is the absorption coefficient and is the wavelength. For a thin film coating on a transparent substrate, spectroscopy can be used to measure the absorptance A as 100%—T-R, where T is transmittance and R is reflectance. The measured A can be appropriately corrected for the A of the substrate to obtain A of the thin film itself. The resulting A can then be used to determine α according to the equation α=−ln [(100%−A)/100%]/h where h is the thickness of the thin film coating; this equation for α is an approximation used when R is relatively small, and A is relatively large. The thickness h can be measured, for example, by stylus profilometry or cross-sectional scanning electron microscopy.

The light absorbing material for the optically absorptive layer 152, and/or for the first layer 154, and/or for the second layer 156, and/or for the cladding layers 5142, and/or for the optically absorptive core layer 5141 can be one or more of dyes, pigments, or particles (e.g., nanoparticles). Suitable light absorbing materials include carbon black nano-pigments and other nano-pigments such as those available from Cabot Corporation (Boston, MA) under the CAB-O-JET tradename. Other suitable light absorbing materials include those described in International Pat. Appl. Pub. No. WO 2019/118685 (Schmidt et al.).

In some embodiments, the first layer 154 has a concentration C1 of light absorbing material 184 and the optically absorptive layer 152 has a concentration C2 of light absorbing material 182, where C2>C1. In some embodiments, C1<0.7 C2, or C1<0.5 C2. Similarly, in some embodiments, the cladding layer(s) 5142 has a concentration C1' of light absorbing material 184 and the optically absorptive core layer 5141 has a concentration C2' of light absorbing material 182, where C2'>C1'. In some embodiments, C1'<0.7 C2', or C1'<0.5 C2'.

The concentration of light absorbing material (e.g., light absorbing nanoparticles) in the optically absorptive layer or core layer can be at least 10, 15, 20, 25, 30, 35, 40, 45, or 50 wt. % of the optically absorptive layer or core layer. In some embodiments, the concentration of light absorbing material in the optically absorptive layer (resp., core layer) is at least 55, 60, 65, 70, 75, 80, 85, 90 or 95 wt. % of the optically absorptive layer (resp., core layer). In some embodiments, the concentration of light absorbing material in the optically absorptive layer or core layer is 100 wt. %. In some embodiments, the concentration of light absorbing material in the optically absorptive layer (resp., core layer) is 30-100 wt. % or 75-90 wt. % of the optically absorptive layer (resp., core layer).

The concentration of light absorbing material in the first layer (resp., cladding layer) is preferably less than the concentration of light absorbing material in the optically absorptive layer (resp., core layer). The concentration of light absorbing material in the first layer (resp., cladding layer) is typically at least 0.5, 1, 5, 10, 15, 20, 25, 30, 35, 40 or 45 wt. % of the first layer (resp., cladding layer). In some embodiments the concentration of light absorbing material in the first layer (resp., cladding layer) is no more than 20, 25, 30, 35, 40, 45, 50, 55, 60, 70, or 75 wt. % of the first layer (resp., cladding layer). In some embodiments, the concentration of light absorbing material in the first layer (resp., cladding layer) is 0.5-50 wt. % or 25-45 wt. % of the first layer (resp., cladding layer).

Figure 9:
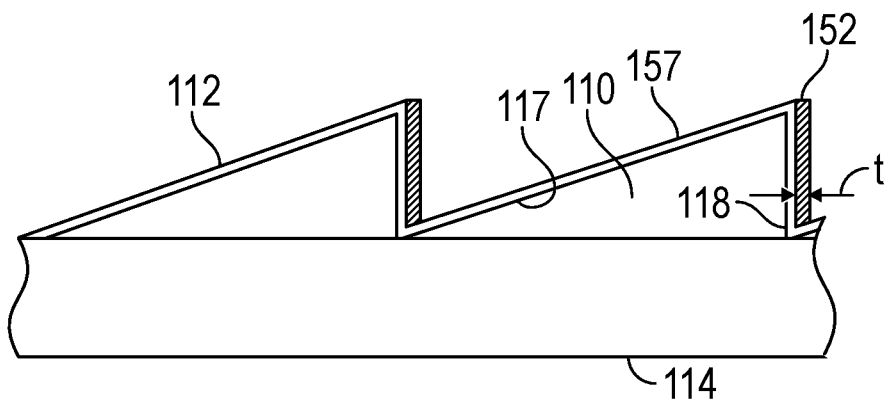
Figure 10:
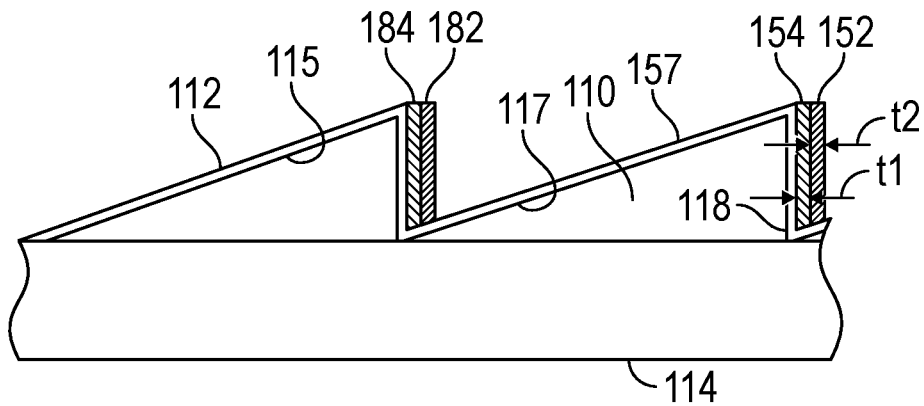
Figure 11:
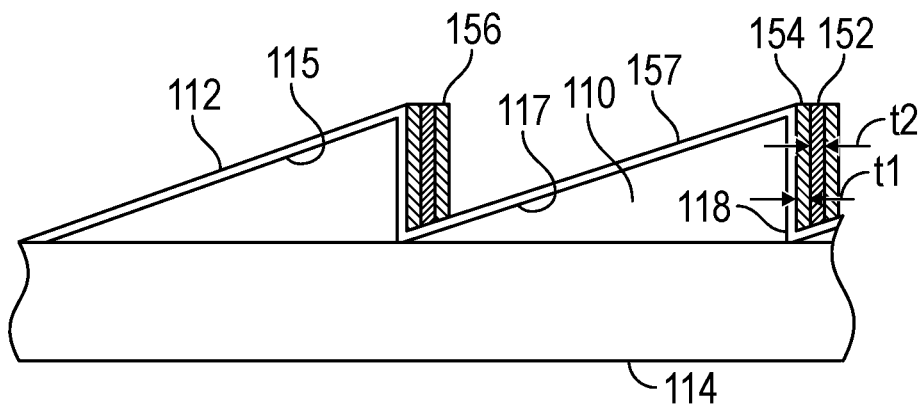

FIGS. 8-12 are schematic cross-sectional views of portions of a structured film (e.g., corresponding to structured film 101). In some embodiments, as schematically illustrated in FIG. 8, for example, the plurality of polymeric microstructures 115 is conformally coated with an inorganic optically transparent layer 157. In some embodiments, as schematically illustrated in FIG. 9, for example, for each microstructure in at least a majority of the microstructures 115, an optically absorptive layer 152 is disposed on and substantially covers the inorganic optically transparent layer 157 disposed on the sidewall 118. In some embodiments, as schematically illustrated in FIG. 10, for example, for each microstructure in at least the majority of the microstructures 115, a first layer 154 is disposed between the sidewall 118 and the optically absorptive layer 152. In some embodiments, the first layer 154 has an extinction coefficient k1, the optically absorptive layer 152 has an extinction coefficient k2, and k2−k1>0.05, as described further elsewhere. In some embodiments, as schematically illustrated in FIG. 9, for example, the first layer 154 is omitted. In some embodiments, as schematically illustrated in FIG. 11, for example, for each microstructure in at least the majority of the microstructures 115, a second layer 156 is disposed on the optically absorptive layer 152 opposite the sidewall 118 or opposite the first layer 154. The second layer 156 can be a protective layer and/or and antireflective layer, for example. The second layer 156 can be as generally described for the first layer 154 (e.g., having an average thickness and/or extinction coefficient and/or concentration of optically absorptive material in the ranges described for the first layer 154). In some embodiments, the second layer 156 is included and the first layer 154 is omitted. The inorganic optically transparent layer 157 may be optionally omitted.

Figure 12:
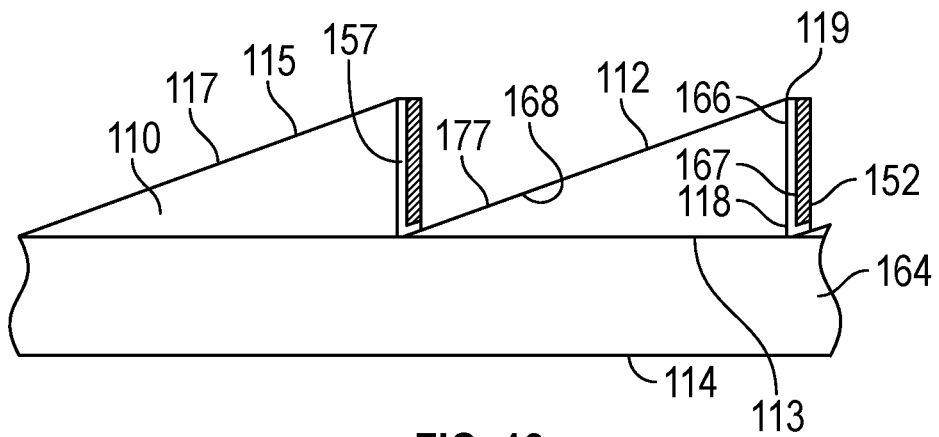

In some embodiments, as schematically illustrated in FIG. 12, for example, the microstructured surface 168 is only partially coated with the inorganic optically transparent layer 157 (e.g., only on the sidewalls). For example, the inorganically optically transparent layer can be conformally coated onto the microstructured surface 168 and then subsequently removed (or at least partially removed) from the optical facets. In any of the embodiments illustrated in FIGS. 8-11, the inorganic optically transparent layer 157 can optionally be removed or partially removed (e.g., a thin layer can remain) from the optical facets, for example. In some embodiments, the first major surface 112 of the structured film can include a major surface of the inorganic optically transparent layer 157 (e.g., the surfaces 167 of the plurality of sidewalls 118).

In some embodiments, the inorganic optically transparent layer 157 can be provided on the sidewalls along with other layer(s) such as an optically absorptive layer as follows. The inorganically optically transparent layer can be conformally coated onto a microstructured polymeric layer, an optically absorptive layer (and optionally other layers) can be conformally coated onto the inorganic optically transparent layer, the optically absorptive layer (and optionally other layers) can be removed from the optical facets in a first etching step, then the inorganic optically transparent layer can be removed, or partially removed, from the optical facets in a second etching step. The first and second etching steps can utilize different etchants (e.g., an oxygen only plasma for the first etching step and a fluorinated gas or other halogenated gas for the second etching step), for example, in order to remove the desired layer(s) in the corresponding etching step.

In some embodiments, for each microstructure in at least the majority of the microstructures 115, the first layer 154 has an average thickness t1, and the optically absorptive layer 152 has an average thickness t2. In some embodiments, t1 and t2 are each greater than 100 nm and less than 2 micrometers or less than 1 micrometer or less than 500 nm. In some embodiments, t1 and t2 are each less than 500 nm. In some embodiments, for each microstructure in at least the majority of the microstructures 115, the sidewall 118 of the microstructure has a height H from a base of an adjacent microstructure to the ridge 119 of the microstructure. In some embodiments, H/t1>10, or H/t1>12, or H/t1>15, or H/t1>18, or H/t1>20. In some embodiments, H/t1<100. In some embodiments, H/t2>10, or H/t2>12, or H/t2>15, or H/t2>18, or H/t2>20. In some embodiments, H/t2<100. For example, in some embodiments, H/t1>15 and H/t2>15.

Figure 13:
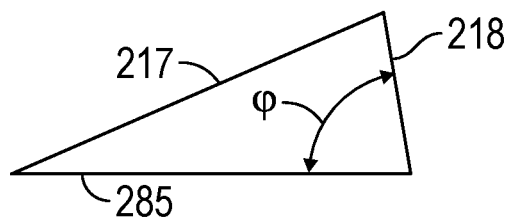
FIGS. 13-15 are schematic cross-sectional views of microstructures.
Figure 14:
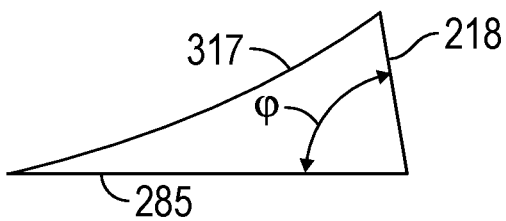
Figure 15:
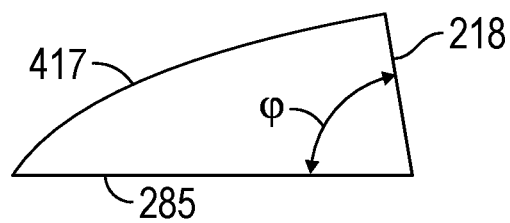

In some embodiments, for each microstructure in at least a majority of the microstructures, the optical facet 117 is planar (e.g., as in typical conventional Fresnel lenses, or in typical conventional light redirecting prisms). FIG. 13 is a schematic illustration of a microstructure with a planar optical facet 217 where the sidewall 218 of the microstructure makes an angle φ with a base 285 of the microstructure. In other embodiments, for each microstructure in at least a majority of the microstructures 115, the optical facet 117 is curved. For example, the facets can be curved to adjust various optical properties as described in U.S. Statutory Invention Registration No. H423 (Mohon et al.), for example. The optical facets 117 may be curved as schematically depicted in FIG. 14 for curved optical facet 317 (concave towards the sidewall 218 and/or towards the base 285 and/or towards the major surface 114 (see, e.g., FIG. 1)) or as schematically depicted in FIG. 15 for curved optical facet 417 (convex towards the sidewall 218 and/or towards the base 285 and/or towards the major surface 114), for example. The angle φ in FIGS. 13-15 may be as described elsewhere (e.g., in a range of 85 to 90 degrees).

Figure 16:
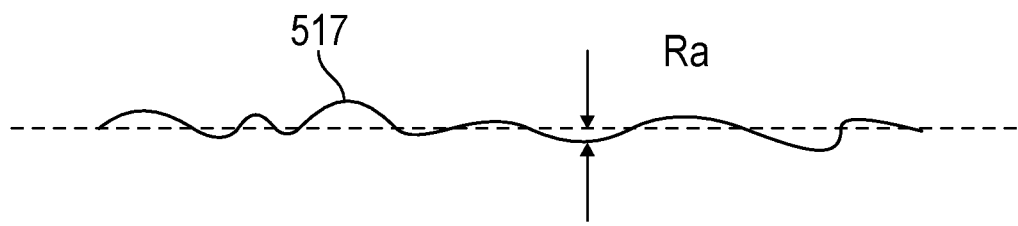
FIG. 16 is a schematic illustration of mean deviation surface roughness.

FIG. 16 is a schematic illustration of a mean deviation surface roughness Ra of a surface 517 which can be a surface of an optical facet. The mean deviation surface roughness Ra is the mean (e.g., mean over a length in a cross-section through the facet (e.g., in a cross-section orthogonal to a length of the facet) or mean over an area of the facet) of the absolute value of the deviation of surface height from a mean surface height. In the case of a curved facet, the deviation in surface height can be defined relative to a mean or nominal curved surface. In some embodiments, for each microstructure in at least a majority of the microstructures 115, the optical facet 117 has a mean deviation surface roughness Ra<250 nm. In some embodiments, Ra is less than 200 nm, 150 nm, 100 nm, 70 nm, 50 nm, 30 nm, or 20 nm. In some embodiments, Ra is greater than 50 nm, 70 nm, 90 nm. For example, in some embodiments, 50 nm<Ra<200 nm or 70 nm<Ra<200 nm. For some applications, it is desired for the optical facet 117 to be optically smooth (e.g., Ra<50 nm). For other applications, some degree of surface roughness may be desired (e.g., 50 nm<Ra<250 nm or 90 nm<Ra<200 nm). For example, it may be useful to have some degree of surface roughness for antireflection, for providing an (e.g., weak) optical diffusion, and/or for improving bonding. It has been found that using the processes described in International Pat. Appl. No. WO 2019/118685 (Schmidt et al.) to deposit and remove an optically absorptive layer from the sloped facets results in a surface roughness that is higher than desired (e.g., Ra greater than 300 nm or greater than 400 nm) for many applications, even though the same process applied to horizontal facets results in low surface roughness. However, it has been found that the surface roughness (e.g., Ra) can be reduced (e.g., to less than 250 nm or to less than 200 nm) by carefully controlling the time that the optical facet is exposed to plasma in a reactive ion etching process, for example. Further, it has been found that applying an inorganic optically transparent layer as an etch stop prior to applying the optically absorptive layer (and/or other layers) can further reduce the surface roughness and can result in optically smooth optical facets (e.g., Ra<50 nm) even with longer etch times. The root-mean-square surface roughness Rq can also be determined and can be in any of the ranges described for Ra.

The surface roughness can be determined from surface profiled measured via atomic force microscopy (AFM), stylus profilometry, or optical profilometry, for example. AFM is typically preferred for small surface roughness (e.g., less than 50 nm).

The inorganic optically transparent layer, the first layer (e.g., cladding layer), the optically absorptive layer, and/or the second layer (e.g., protective layer) can be deposited (e.g., as a conformal coating over an entire structured surface) using any suitable deposition technique. Similarly, in making the light control film, the cladding layer(s) 5142 and the optically absorptive core layer 5141 can be deposited using any suitable deposition technique. Various coating methods that can be used include, for example, layer-by-layer (LbL) coating, chemical vapor deposition (CVD), sputtering, reactive sputtering, and atomic layer deposition (ALD). At least some of the deposited layers (e.g., all of the layers, or all of the layers except the optional inorganic optically transparent layer) can subsequently be substantially removed from the optical facets (e.g., removed at least to the extent that any material from the at least some of the deposited layers remaining on the optical facets does not significantly affect optical performance).

In some embodiments, at least one of the first layer and the optically absorptive layer, or at least one of the cladding layers and the core layer, includes at least two bi-layers deposited by what is commonly referred to as a "layer-by-layer self-assembly process". This process is commonly used to assemble films or coatings of oppositely charged polyelectrolytes electrostatically, but other functionalities such as hydrogen bond donor/acceptors, metal ions/ligands, and covalent bonding moieties can be the driving force for film assembly. Some examples of suitable processes include those described in U.S. Pat. No. 8,234,998 (Krogman et al.,) and U.S. Pat. No. 8,313,798 (Nogueira et al.); in U.S. Pat. Appl. Pub. No. 2011/0064936 (Hammond-Cunningham et al.); and in International Pat. Appl. No. WO 2019/118685 (Schmidt et al.). Layer-by layer dip coating can be conducted using a StratoSequence VI (nanoStrata Inc., Tallahassee, FL) dip coating robot, for example.

In some embodiments, the plurality of bi-layers deposited by layer-by-layer self-assembly is a polyelectrolyte stack including an organic polymeric polyion (e.g., cation) and counterion (e.g., anion) including a light absorbing material (e.g., pigment). At least a portion of the cation layers, anion layers, or a combination thereof can include a light absorbing material (e.g., pigment) ionically bonded to the polyelectrolyte. A light absorbing compound can be dispersed within at least a portion of the polyelectrolyte layers. Various polyelectrolytes can be utilized including inorganic compounds, such as silica or silicate, as well as various phosphonocarboxylic acids and salts thereof (some of which are described in U.S. Pat. No. 10,365,415 (Schmidt)).

The thickness of a bi-layer and the number of bi-layers can be selected to achieve the desired optical properties (e.g., light absorption in the case of the optically absorptive layer, or reduced reflection between the sidewall and the optically absorptive layer in the case of the first layer). In some embodiments, the thickness of a bi-layer and/or the number of bi-layers are selected to achieve the desired optical properties using the minimum total thickness of self-assembled layers and/or the minimum number of layer-by-layer deposition steps. The thickness of each bi-layer typically ranges from about 5 nm to 350 nm. The number of bi-layers is typically at least 5, 6, 7, 8, 9, or 10. In some embodiments, the number of bilayers per stack is no greater than 150 or 100. It should be appreciated that individual bi-layers in the final article may not be distinguishable from each other by common methods in the art such as scanning electron microscopy (SEM) or transmission electron microscopy (TEM). In some embodiments, the thickness of the bi-layers and the total number of bi-layers are selected such that the total thickness of the first layer and the optically absorptive layer is less than 2 micrometers.

After applying and drying the optically absorptive layer and optionally the first and/or second layers and/or the inorganic optically transparent layer to the (e.g., entire) micro structured surface of the film, the optically absorptive layer and the first and second layer, when present, can then be removed from the optical facets and also removed from the land regions, if any, between adjacent microstructures. The inorganic optically transparent layer, which can function as an etch stop, is typically not removed, but can optionally be removed in a subsequent etching step. The core and/or cladding layers can similarly be removed from the top surfaces of a structured surface used to make the light control film.

Any suitable method can be used to selectively remove layer(s) from the optical facets or the top surfaces. In some embodiments, layer(s) are removed by reactive ion etching. Reactive ion etching (RIE) is a directional etching process utilizing ion bombardment to remove material. RIE systems are used to remove organic or inorganic material by etching surfaces in the direction of the ion bombardment. The most notable difference between reactive ion etching and isotropic plasma etching is the etch direction. Reactive ion etching is characterized by a ratio of the vertical etch rate to the lateral etch rate which is greater than 1. Systems for reactive ion etching are typically built around a durable vacuum chamber. Before beginning the etching process, the chamber is typically evacuated to a base pressure lower than 1 Torr, 100 mTorr, 20 mTorr, 10 mTorr, or 1 mTorr. Typically, an electrode holds the materials to be treated and is electrically isolated from the vacuum chamber. The electrode may be a rotatable electrode in a cylindrical shape. A counter electrode is typically also provided within the chamber and may include the vacuum reactor walls. Gas including an etchant typically enters the chamber through a control valve. The process pressure can be maintained by continuously evacuating chamber gases through a vacuum pump. The type of gas used varies depending on the etch process. Etchants can include on or more of oxygen, fluorinated gases, or other halogenated gases, for example. Carbon tetrafluoride ($CF_4$), sulfur hexafluoride ($SF_6$), octafluoropropane ($C_3F_8$), perfluorohexane ($C_6F_{14}$), fluoroform ($CHF_3$), boron trichloride ($BCl_3$), hydrogen bromide (HBr), nitrogen trifluoride ($NF_3$), chlorine, argon, and oxygen are commonly used for etching. Radio frequency (RF) power is applied to the electrode to generate a plasma. Reactive ion etching is known in the art and further described in U.S. Pat. No. 8,460,568 (David et al.) and in International Pat. Appl. No. WO 2019/118685 (Schmidt et al.), for example.

Samples can be conveyed on the electrode through plasma for a controlled time period to achieve a specified etch depth or to limit the etch so that the etch does not penetrate below the layer(s) desired to be removed. For example, if it is desired to remove an optically absorptive layer and the inorganic optically transparent layer is not included, the time period can be adjusted to minimize the time that the optical facets may be exposed to the plasma. This can reduce the surface roughness of the optical facets (e.g., such that Ra<250 nm) as described elsewhere.

In some embodiments, the optically absorptive layer (and/or other layers) are removed by laser ablation, e.g., pulsed laser ablation. Pulsed laser ablation (PLA) is a directional ablation process utilizing a photon flux to generate enough photon fluence to remove material through oxidation and/or sputtering. PLA systems are used to remove organic or inorganic material by etching surfaces in the direction of the photon fluence which can vaporize the target in the generation of a plasma plume. PLA is dependent on the wavelength of the laser, and the amount of absorption present at that wavelength in the light absorbing material. Absorption of the laser pulse generates energy for thermal, chemical, or mechanical evaporation, ablation, and/or plasma formation. The presence of oxidizing gas in the location of the laser pulse may change the amount of chemical oxidation occurring during the PLA process. The fluence can be changed by the optical configuration to change the size and location of the focal spot and by the power setpoints of laser systems. The relative orientation of the laser fluence and the sample can allow one skilled in the art to ablate optically absorptive layers coated on a structured surface at oblique angles.

Figure 17:
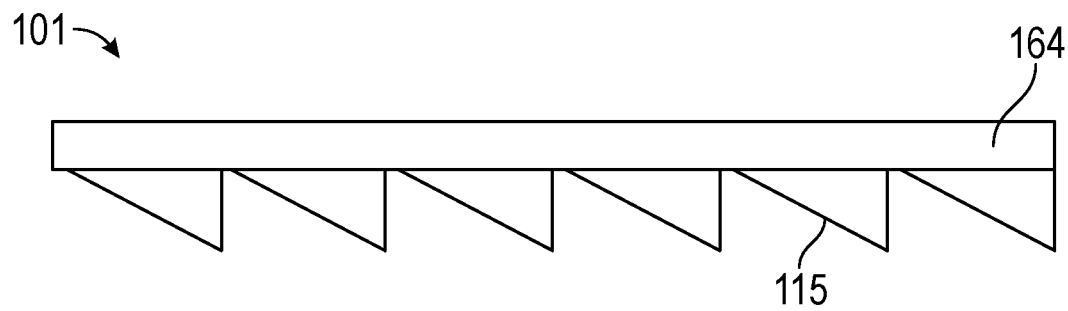
FIGS. 17-23 are schematic illustrations of steps in methods of making optical films.
Figure 18:
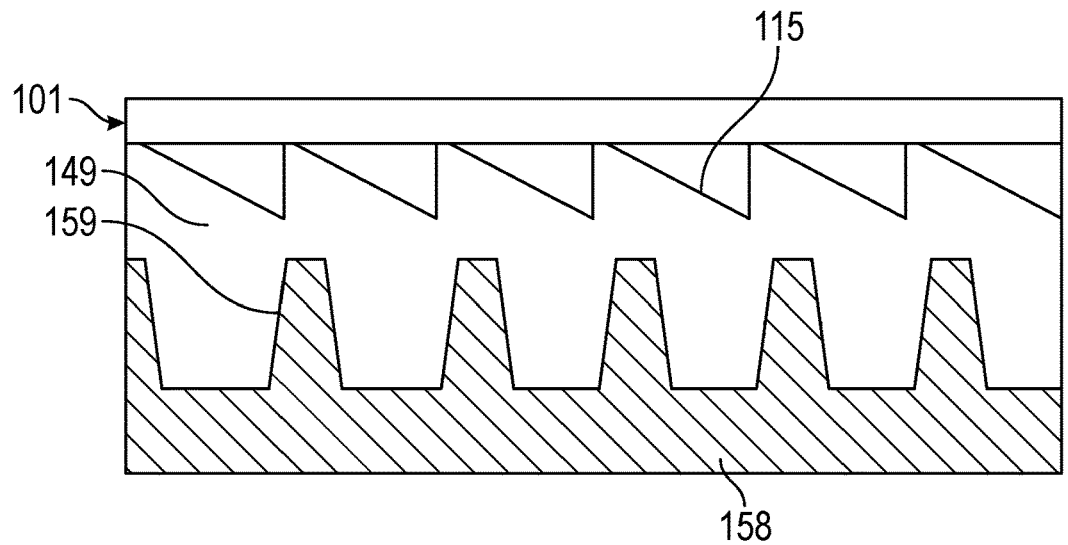
Figure 19:
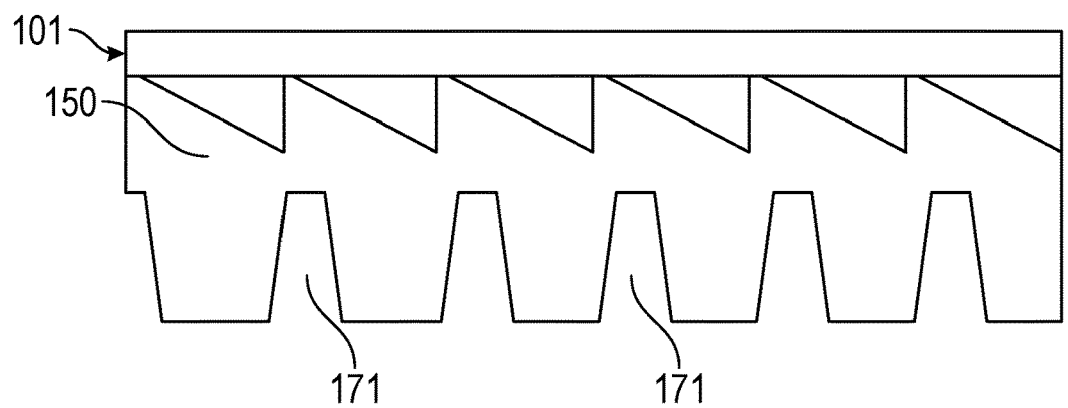

FIGS. 17-19 schematically illustrates a method of making an optical film (e.g., corresponding to optical film 100). The method can include providing a structured film 101 that includes a substrate 164 and a plurality of polymeric microstructures 115 formed on a major surface of the substrate 164. Each microstructure can include an optical facet 117 and a sidewall 18 meeting the optical facet 117 at a ridge 119 of the microstructure 115 as described further elsewhere. The method can include forming a light control film 155 on the structured film 101. As described further elsewhere the light control film can include an optically transparent material 150 disposed on and covering the plurality of polymeric microstructures 115, and a plurality of optically absorptive louvers 151 formed in the optically transparent material 150 opposite the structured film 101. Forming the light control film 155 on the structured film 101 can include disposing a resin 149 on the plurality of polymeric microstructures 115 and curing the resin to provide the optically transparent material 150. FIG. 18 schematically illustrates a resin 149 disposed on the microstructures 115 and contacting a structured tool surface 159 of the tool 158. In some embodiments, curing the resin 149 includes at least partially curing the resin while the resin is in contact with the structured tool surface 159 such that a plurality of substantially parallel channels or grooves 171 is formed in the optically transparent material 150 opposite the structured film. The method can further include at least partially filling the grooves with optically absorptive material to provide the plurality of optically absorptive louvers 151 (see, e.g., FIG. 1).

Figure 20:
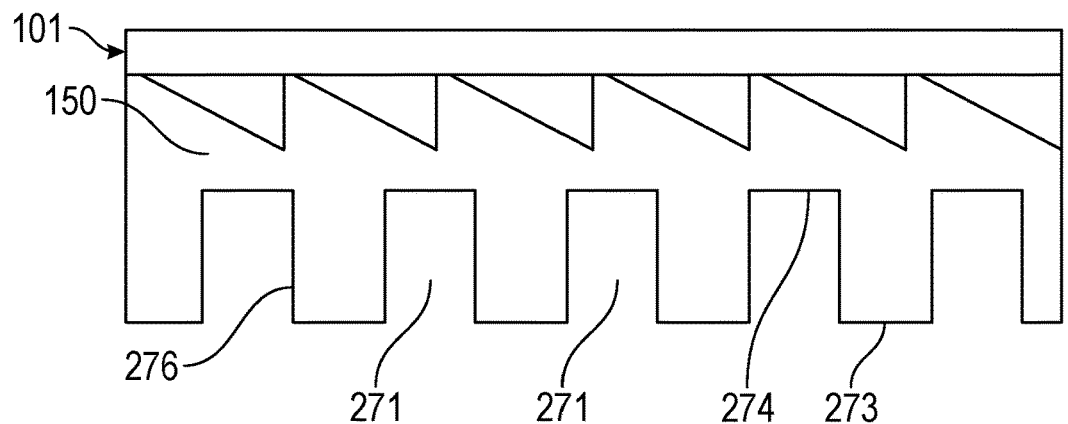
Figure 21:
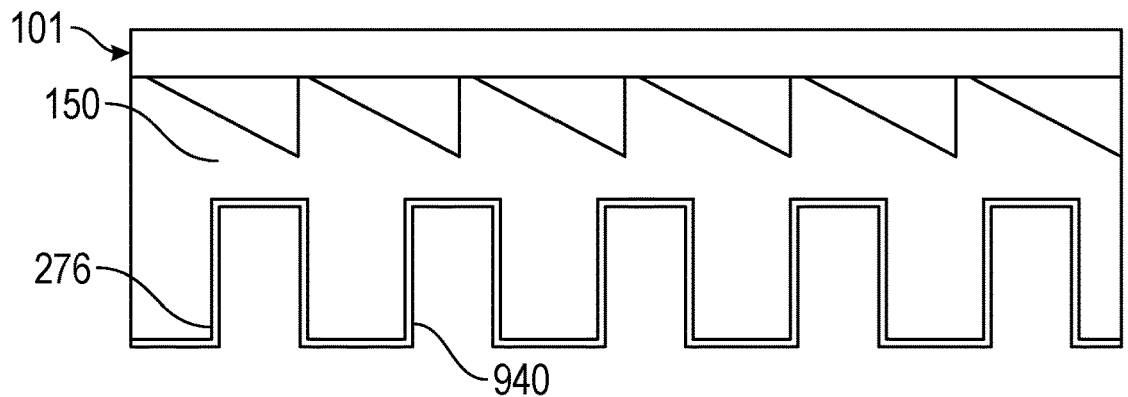
Figure 22:
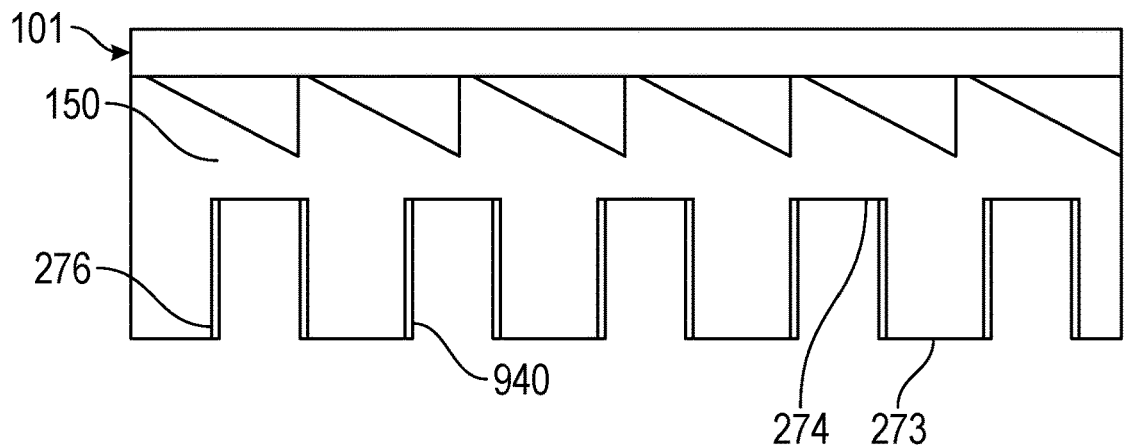
Figure 23:
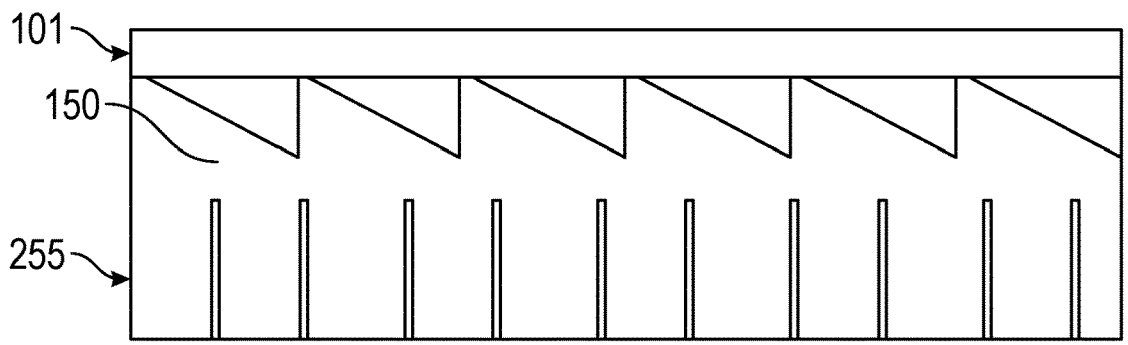

FIG. 20 is a schematic cross-sectional view of an alternate embodiment of the structured optically transparent material 150 which has a structured major surface 276 including a plurality of grooves or channels 271 defining top and bottom surfaces 273 and 274. The structured major surface 276 can be formed by a suitable selection of a tool. The channels may have slightly tapered walls (e.g., 0.5 to 5 degrees) to facilitate removal of the material 150 from the tool. As schematically illustrated in FIG. 21, in some embodiments, the method includes conformally coating the structured major surface 276 with one or more optically absorptive layers 940 (e.g., a core layer and optionally a cladding on one or both sides of the core layer). As schematically illustrated in FIG. 22, in some embodiments, the method includes removing (e.g., via reactive ion etching or laser ablation as described elsewhere) the one or more optically absorptive layers 940 from the top and bottom surfaces 273 and 274. As schematically illustrated in FIG. 23, in some embodiments, the method includes filling the channels 271 with optically transparent material 150 to provide a light control film 255 (e.g., corresponding to light control film 5100).

Figure 24:
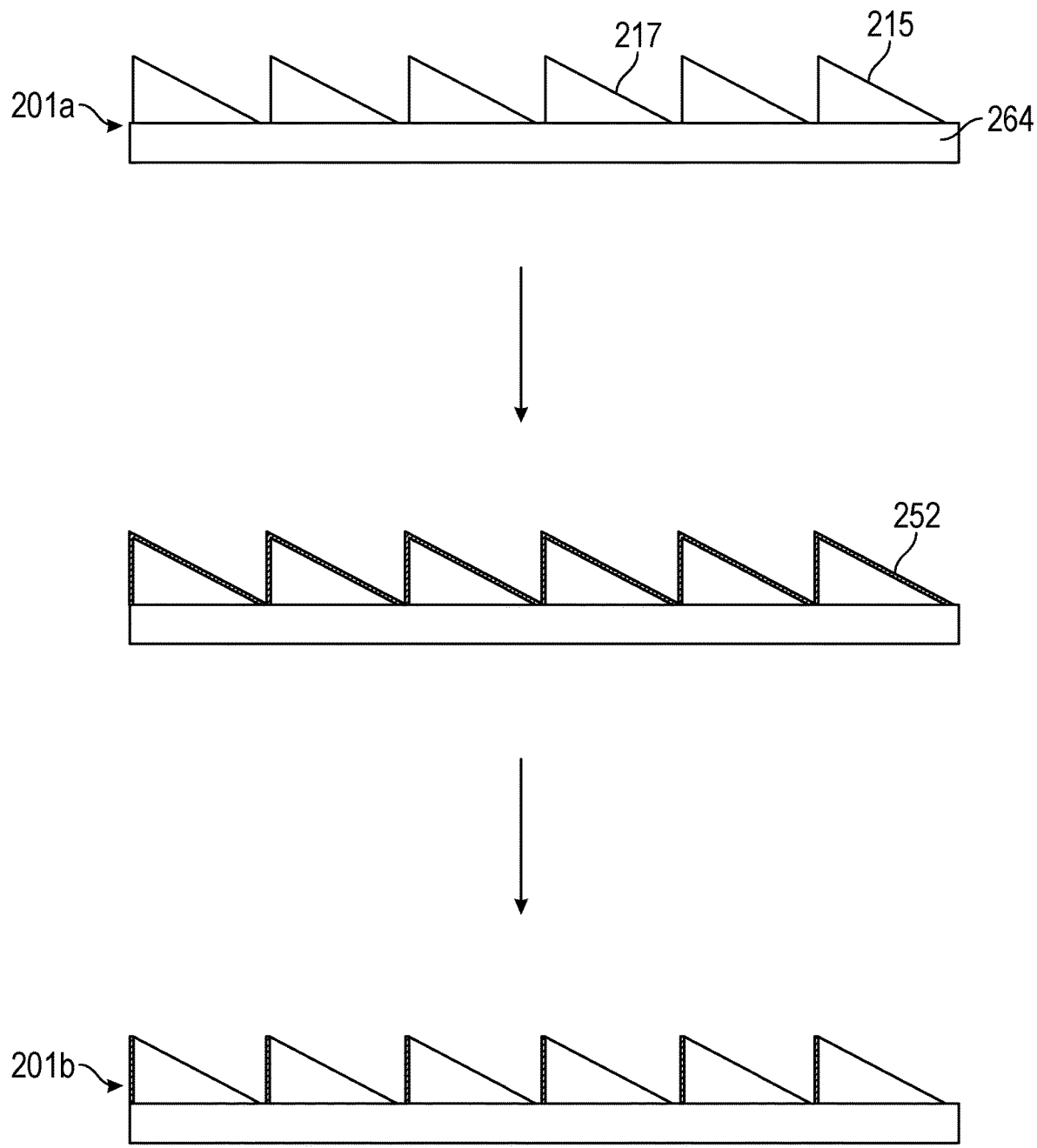
FIG. 24 is a schematic illustration of a method of making a structured film.

The method can include providing the structured film 101 and forming the light control film 155 on the structured film 101. In some embodiments, the method further includes, between the providing and forming steps: disposing an optically absorptive layer 152 on the plurality of polymeric microstructures; and removing the optically absorptive layer from the optical facets. In some embodiments, the method further includes, prior to the disposing the optically absorptive layer step, disposing an inorganic optically transparent layer 157 on the plurality of polymeric microstructures 115. For example, as schematically illustrated in FIG. 24, the method can include providing a structured film 201a having a plurality of polymeric microstructures 215 disposed on a substrate 264, disposing one or more layers 252 (e.g., including an optically absorptive layer and optionally an inorganic optically transparent layer) on the plurality of polymeric microstructures 215, and removing the one or more layers 252 (or at least a portion of the one or more layers 252) from optical facets 217 of the microstructures 215 to provide the structured film 201b.

Examples of optical films including microstructures that each have an optical facet and a sidewall meeting the optical facet at a ridge of the microstructure where an optically absorptive layer is disposed on the sidewall but not on the optical facet are described in U.S. Appl. No. 62/932,578 filed on Nov. 8, 2019 and titled "OPTICAL FILM".

The following is a list of illustrative embodiments of the present description.

A first embodiment is an optical film comprising:
a structured film comprising a substrate and a plurality of polymeric microstructures formed on a major surface of the substrate, each microstructure comprising an optical facet and a sidewall meeting the optical facet at a ridge of the microstructure; and
a light control film formed on the structured film, the light control film comprising:
an optically transparent material disposed on and covering the plurality of polymeric microstructures; and
a plurality of optically absorptive louvers formed in the optically transparent material opposite the structured film, the louvers extending along a longitudinal direction and spaced apart along an orthogonal transverse direction, the louvers having an average depth D into the optically transparent material and an average width W in the transverse direction, D/W>2,
wherein the optical film is integrally formed.

A second embodiment is the optical film of the first embodiment, wherein for each microstructure in at least a majority of the microstructures, an optically absorptive layer is disposed on and substantially covers the sidewall, the optically absorptive layer having an average thickness t, 100 nm<t<1 micrometer.

A third embodiment is the optical film of the second embodiment, wherein for each microstructure in at least a majority of the microstructures, the sidewall of the microstructure has a height H from a base of an adjacent microstructure to the ridge of the microstructure, H/t>15.

A fourth embodiment is the optical film of any one of the first through third embodiments, wherein the plurality of polymeric microstructures is conformally coated with an inorganic optically transparent layer.

A fifth embodiment is the optical film of the fourth embodiments, wherein for each microstructure in at least a majority of the microstructures, an optically absorptive layer is disposed on and substantially covers the inorganic optically transparent layer disposed on the sidewall.

A sixth embodiment is the optical film of the fifth embodiment, wherein for each microstructure in at least the majority of the microstructures, a first layer is disposed between the inorganic optically transparent layer and the optically absorptive layer, the first layer having an extinction coefficient k1, the optically absorptive layer having an extinction coefficient k2, k2-k1>0.05.

A seventh embodiment is the optical film of any one of the first through sixth embodiments, wherein for each microstructure, the ridge of the microstructure extends along the longitudinal direction across at least a majority of a length of the optical film.

An eighth embodiment is the optical film of any one of the first through seventh embodiments, wherein each microstructure in the plurality of polymeric microstructures is a linear prism having a substantially same angle between the optical facet and the sidewall.

A ninth embodiment is the optical film of any one of the first through seventh embodiments, wherein each microstructure in the plurality of polymeric microstructures is a linear Fresnel element.

A tenth embodiment is the optical film of any one of the first through ninth embodiments, wherein the plurality of polymeric microstructures has a refractive index n1, the optically transparent material has a refractive index n2, and n1-n2>0.05.

An eleventh embodiment is an optical stack comprising the optical film of any one of the first through tenth embodiments laminated to a second substrate, the light control film facing the second substrate.

A twelfth embodiment is a method of making an optical film, the method comprising:
  providing a structured film comprising a substrate and a plurality of polymeric microstructures formed on a major surface of the substrate, each microstructure comprising an optical facet and a sidewall meeting the optical facet at a ridge of the microstructure;
  forming a light control film on the structured film, the light control film comprising:
    an optically transparent material disposed on and covering the plurality of polymeric microstructures; and
    a plurality of optically absorptive louvers formed in the optically transparent material opposite the structured film, the louvers extending along a longitudinal direction and spaced apart along an orthogonal transverse direction, the louvers having an average depth D into the optically transparent material and an average width W in the transverse direction, D/W>2,
  wherein forming the light control film on the structured film comprises disposing a resin on the plurality of polymeric microstructures and curing the resin to provide the optically transparent material.

A thirteenth embodiment is the method of the twelfth embodiment, wherein curing the resin comprises at least partially curing the resin while the resin is in contact with a structured tool surface such that a plurality of substantially parallel grooves is formed in the optically transparent material opposite the structured film, the method further comprising at least partially filling the grooves with optically absorptive material to provide the plurality of optically absorptive louvers.

A fourteenth embodiment is the method of the twelfth or thirteenth embodiments, further comprising, between the providing and forming steps:
  disposing an optically absorptive layer on the plurality of polymeric microstructures; and
  removing the optically absorptive layer from the optical facets.

A fifteenth embodiment is the method of the fourteenth embodiment, further comprising, prior to the disposing the optically absorptive layer step, disposing an inorganic optically transparent layer on the plurality of polymeric microstructures.

All references, patents, and patent applications referenced in the foregoing are hereby incorporated herein by reference in their entirety in a consistent manner. In the event of inconsistencies or contradictions between portions of the incorporated references and this application, the information in the preceding description shall control.

Descriptions for elements in figures should be understood to apply equally to corresponding elements in other figures, unless indicated otherwise. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. An optical film comprising:
   a structured film comprising a substrate and a plurality of polymeric microstructures formed on a major surface of the substrate, each microstructure comprising an optical facet and a sidewall meeting the optical facet at a ridge of the microstructure; and
   a light control film formed on the structured film, the light control film comprising:
     an optically transparent material disposed on and covering the plurality of polymeric microstructures; and
     a plurality of optically absorptive louvers formed in the optically transparent material opposite the structured film, the louvers extending along a longitudinal direction and spaced apart along an orthogonal transverse direction, each of the louvers having an average depth D into the optically transparent material and an average width W in the transverse direction, D/W>2,
   wherein the optical film is integrally formed.

2. The optical film of claim 1, wherein for each microstructure in at least a majority of the microstructures, an optically absorptive layer is disposed on and substantially covers the sidewall, the optically absorptive layer having an average thickness t, 100 nm<t<1 micrometer.

3. The optical film of claim 2, wherein for each microstructure in at least a majority of the microstructures, the sidewall of the microstructure has a height H from a base of an adjacent microstructure to the ridge of the microstructure, H/t>15.

4. The optical film of claim 1, wherein the plurality of polymeric microstructures is conformally coated with an inorganic optically transparent layer.

5. The optical film of claim 4, wherein for each microstructure in at least a majority of the microstructures, an optically absorptive layer is disposed on and substantially covers the inorganic optically transparent layer disposed on the sidewall.

6. The optical film of claim 5, wherein for each microstructure in at least the majority of the microstructures, a first layer is disposed between the inorganic optically transparent layer and the optically absorptive layer, the first layer having an extinction coefficient k1, the optically absorptive layer having an extinction coefficient k2, k2-k1>0.05.

7. The optical film of claim 1, wherein for each microstructure, the ridge of the microstructure extends along the longitudinal direction across at least a majority of a length of the optical film.

8. The optical film of claim 1, wherein each microstructure in the plurality of polymeric microstructures is a linear prism having a substantially same angle between the optical facet and the sidewall.

9. The optical film of claim 1, wherein each microstructure in the plurality of polymeric microstructures is a linear Fresnel element.

10. The optical film of claim 1, wherein the plurality of polymeric microstructures has a refractive index n1, the optically transparent material has a refractive index n2, and n1-n2>0.05.

11. An optical stack comprising the optical film of claim 1 laminated to a second substrate, the light control film facing the second substrate.

12. A method of making an optical film, the method comprising the steps of:
   providing a structured film comprising a substrate and a plurality of polymeric microstructures formed on a major surface of the substrate, each microstructure comprising an optical facet and a sidewall meeting the optical facet at a ridge of the microstructure;
   forming a light control film on the structured film, the light control film comprising:
      an optically transparent material disposed on and covering the plurality of polymeric microstructures; and
      a plurality of optically absorptive louvers formed in the optically transparent material opposite the structured film, the louvers extending along a longitudinal direction and spaced apart along an orthogonal transverse direction, each of the louvers having an average depth D into the optically transparent material and an average width W in the transverse direction, D/W>2,
   wherein forming the light control film on the structured film comprises disposing a resin on the plurality of polymeric microstructures and curing the resin to provide the optically transparent material.

13. The method of claim 12, wherein curing the resin comprises at least partially curing the resin while the resin is in contact with a structured tool surface such that a plurality of substantially parallel grooves is formed in the optically transparent material opposite the structured film, the method further comprising at least partially filling the grooves with optically absorptive material to provide the plurality of optically absorptive louvers.

14. The method of claim 12, further comprising, between the providing and forming steps, the steps of:
   disposing an optically absorptive layer on the plurality of polymeric microstructures; and
   removing the optically absorptive layer from the optical facets.

15. The method of claim 14, further comprising, prior to the disposing the optically absorptive layer step, disposing an inorganic optically transparent layer on the plurality of polymeric microstructures.

* * * * *